US006946530B2

(12) United States Patent
Gallice et al.

(10) Patent No.: US 6,946,530 B2
(45) Date of Patent: Sep. 20, 2005

(54) PROCESS FOR THE GAS-PHASE (CO-) POLYMERIZATION OF OLEFINS IN A FLUIDIZED BED REACTOR

(75) Inventors: Alexandre Gallice, Lille (FR); Vince Reiling, Vauvenargues (FR); Jean-Loic Selo, Sausset les Pins (FR)

(73) Assignee: BP Chemicals Limited, Middlesex (GB)

( * ) Notice: Subject to any disclaimer, the term of this patent is extended or adjusted under 35 U.S.C. 154(b) by 0 days.

(21) Appl. No.: 10/492,755

(22) PCT Filed: Oct. 4, 2002

(86) PCT No.: PCT/GB02/04495

§ 371 (c)(1),
(2), (4) Date: Apr. 16, 2004

(87) PCT Pub. No.: WO03/033543

PCT Pub. Date: Apr. 24, 2003

(65) Prior Publication Data

US 2004/0242809 A1 Dec. 2, 2004

(30) Foreign Application Priority Data

Oct. 19, 2001 (EP) .............................................. 01430031

(51) Int. Cl.$^7$ ................................................. C08F 2/34

(52) U.S. Cl. ....................... 526/89; 526/217; 526/219.5; 526/227; 526/237; 526/348; 526/901
(58) Field of Search ....................... 526/89, 217, 219.5, 526/227, 237, 348, 901

(56) References Cited

U.S. PATENT DOCUMENTS

| 4,855,370 A | 8/1989 | Chirillo et al. |
| 5,283,278 A | * 2/1994 | Daire et al. .................. 524/399 |
| 6,022,935 A | 2/2000 | Fischer et al. |
| 6,096,840 A | 8/2000 | Bernier et al. |

FOREIGN PATENT DOCUMENTS

| DE | 198 35 467 A1 | 2/2000 |
| EP | 0 636 636 A1 | 2/1995 |
| EP | 1 061 090 A1 | 12/2000 |
| WO | WO 99/61486 | 12/1999 |
| WO | WO 00/02930 | 1/2000 |

* cited by examiner

Primary Examiner—William K. Cheung
(74) Attorney, Agent, or Firm—Finnegan, Henderson, Farabow, Garrett and Dunner, L.L.P.

(57) ABSTRACT

The present invention relates to a process for the gas-phase (co-)polymerization of olefins in a fluidized bed reactor wherein fouling is prevented and/or flowability of polymer is improved thanks to the use of a process aid additive.

9 Claims, 1 Drawing Sheet

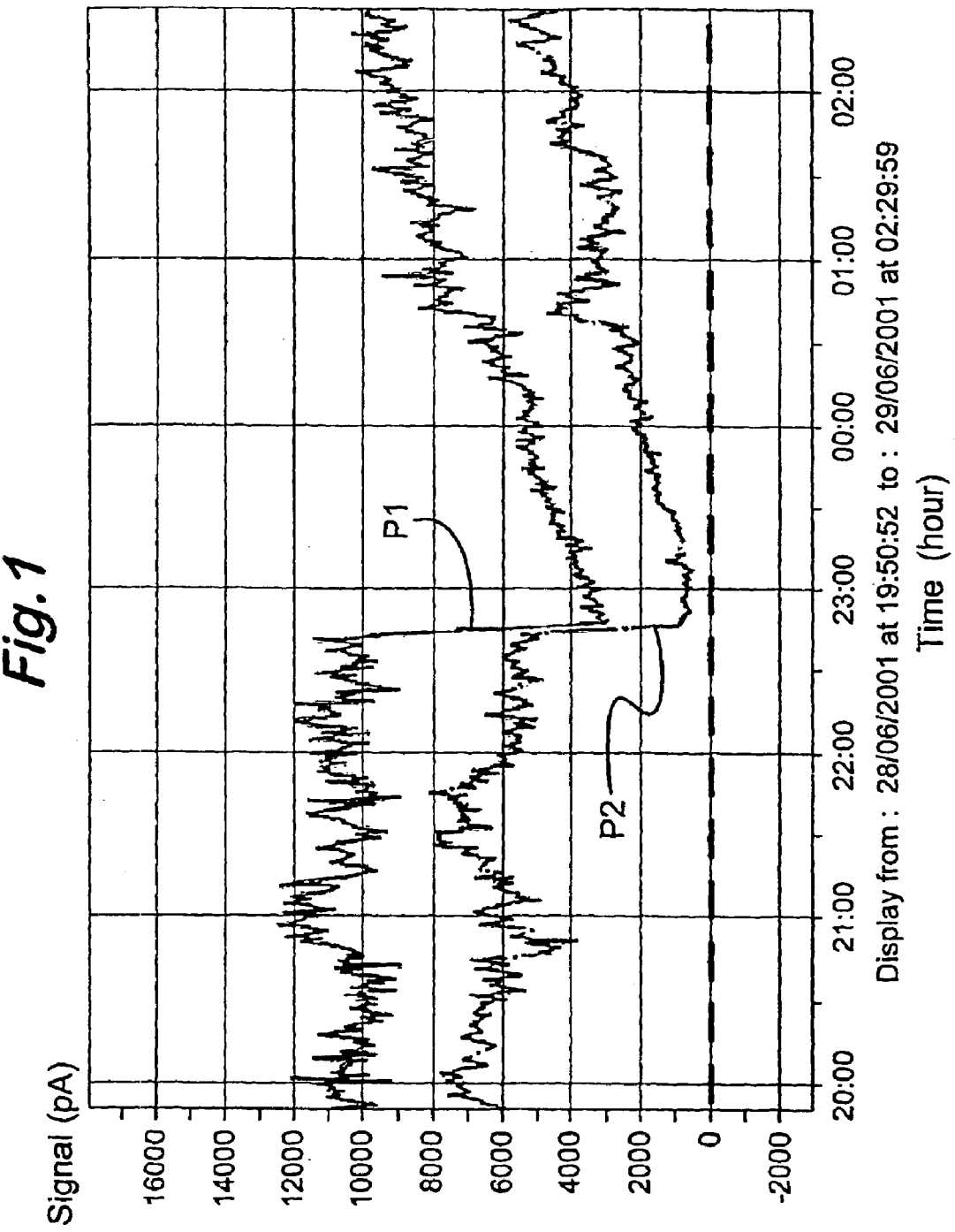

PROCESS FOR THE GAS-PHASE (CO-) POLYMERIZATION OF OLEFINS IN A FLUIDIZED BED REACTOR

The present invention relates to a process for the gas-phase (co-)polymerization of olefins in a fluidised bed reactor.

The present invention also relates to a process for preventing fouling during the. gas-phase (co-)polymerisation of olefins in a fluidised bed reactor.

The present invention further relates to a process for improving the polymer flowability and the fluidisation characteristics during the gas-phase (co-)polymerisation of olefins in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature; In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is also well known that fouling in gas phase polymerisation process can be a major problem, and can be caused by non-uniform fluidisation as well as poor heat transfer in the polymerisation process. Catalyst and polymer particles may adhere together or to the walls of the reactor and continue to polymerise, and often fuse together and form chunks, which can be detrimental to a continuous process, particularly a fluidised bed process. There is thus a need in the art to find a process for producing successfully polyolefins on gas phase industrial plants with a minimum of fouling.

The Applicants have now unexpectedly found a simple and efficient process which reduces fouling problems that may be encountered with the gas phase polymerisation of olefins.

In accordance with the present invention, there has now been found a process for the gas-phase (co-)polymerisation of olefins in a fluidised bed reactor in the presence of a process aid additive characterised in that the additive comprises at least one component selected from (1) glycerol ester of a fatty acid
(2) a sorbitan ester of a fatty acid
(3) an alkylamine carboxylate along with at least one component selected from (4) hydrogen peroxide and/or water
(5) a salt.

More preferably, the process aid additive comprises a mixture of at least one component selected from (1), (2) and (3) with both (4) hydrogen peroxide and/or water and (5) a salt.

The process aid additive of the present invention has been found to be particularly effective for the gas-phase (co-) polymerisation reaction using catalysts of the Ziegler-Natta type in the presence of alkylaluminium compounds, such as trialkylaluminium compounds. However, surprisingly, it has also been found that the effectiveness of the process aid additive for catalysts which are not normally operated in the presence of alkylaluminium compounds, may also be enhanced by the addition of such an alkylaluminium compound, for example, a trialkylaluminium compound, to the (co-)polymerisation reaction. The process aid additive of the current invention is therefore preferably used in a (co-)polymerisation process operating in the presence of an alkylaluminium compound. Suitable alkylaluminium compounds include, for example, trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, ethylaluminiumsesquichloride, methylaluminiumsesquichloride and alumoxanes. Alumoxanes are well known in the art as typically the oligomeric compounds which can be prepared by the controlled addition of water to an alkylaluminium compound, for example trimethylaluminium. Preferably, however, the alkylaluminium is a trialkylaluminium, for example TMA, TIBA or, most preferably, TEA.

In a most preferred embodiment of the present invention, the process aid additive is used for the gas-phase (co-) polymerisation reaction using catalysts of the Ziegler-Natta type in the presence of alkylaluminium compounds, such as trialkylaluminium compounds.

The glycerol ester of a fatty acid is preferably a monoester (a monoglyceride). The fatty acid may be any monobasic acid of general formula $C_n H_{2n+1}COOH$ or any saturated or unsaturated monobasic organic acid derived from a natural fat or oil. Preferably the glycerol ester is selected from one or more of glycerol monooleate, glycerol monostearate, glycerol monolaurate or glycerol monoricinoleate and their derivatives. Glycerol monooleate (for example, Mazol GMO available from Ciba) and glycerol monostearate (for example, Atmer 129 available from Ciba are most preferred.

In one embodiment the sorbitan ester of a fatty acid is preferably a monoester. Alternatively the sorbitan ester is preferably a triester. The fatty acid may be any monobasic acid of general formula $C_nH_{2n+1}COOH$, any saturated or unsaturated monobasic organic acid derived from a natural fat or oil. The sorbitan ester may also be a sorbitan polyoxyethylene fatty acid ester, derived by esterification of sorbitol with a fatty acid in the presence of ethylene oxide.

Preferably the sorbitan ester is selected from one or more of sorbitan monooleate, sorbitan trioleate, sorbitan monostearate, sorbitan monolaurate, sorbitan monoricinoleate, sorbitan polyoxyethylene ester and their derivatives. Sorbitan trioleate (for example, S-Maz 85 available from Ciba) and sorbitan polyoxyethylene esters (for example, Atmer 110 available from Ciba), are most preferred.

The alkylamine carboxylate is preferably one or more alkylamine ethoxylates, such as Atmer 262, available from Ciba.

Preferably the salt is an alkali metal salt, more preferably an alkali metal halide, such as an alkali metal chloride. Most preferably the salt is sodium chloride.

The process aid additive can be added at any location of the fluidised bed polymerisation system, e.g. in the reactor itself, below the fluidisation grid or above the grid in the fluidised bed, above the fluidised bed, in the powder disengagement zone of the reactor, anywhere in the reaction loop or recycle line, in the fines recycle line (when a fines separator, preferably a cyclone, is used) etc. According to a preferred embodiment of the present invention, the process aid additive is directly added into the fines recycle line (when a fines separator, preferably a cyclone, is used) or directly into the polymerisation zone, more preferably directly into the fluidised bed, ideally into the lower part of the bed (below half bed height). For the purposes of the present invention and appended claims, the polymerisation zone means the reaction zone consisting of the fluidised bed itself, and the region above the fluidised bed which consists of the powder disengagement zone and/or the velocity reduction zone. The process aid additive is preferably directly added into the fluidised bed polymerisation reaction zone. For the purpose of the present invention and appended claims, the process aid additive is not a component comprised in the catalyst system. It is also particularly preferred according to the present invention that the process aid additive is not added in admixture with a catalyst component like the catalyst itself or the cocatalyst. According to another preferred embodiment, the process aid additive is added into the fluidised bed polymerisation system through the well known BP high productivity nozzles which protrude through the fluidisation grid directly into the fluidised bed (see e.g. WO9428032, the content of which is incorporated hereby by reference).

According to a preferred embodiment of the present invention, the process aid additive is diluted in a conventional hydrocarbon solvent, such as pentane or heptane, preferably pentane. However, where the process aid or a component thereof is not soluble in a suitable solvent it may be injected into the reactor in pure, solid or liquid form.

When used in solution or in neat liquid form the process aid additive may be injected in any conventional manner, for example, using differential pressure in an injector to push the solution or liquid in to the reactor. A stream of inert gas, such as, for example, nitrogen, or of a process gas may be used to aid the injection by flushing the solution or liquid into the reactor. Solids may also be injected in any known manner, such as, for example, using a stream of nitrogen to flush the solid particles in to the reactor.

According to a preferred embodiment of the present invention, the total weight of components (1), (2), (3), (4), and (5) represents essentially 100% of the weight of the process aid additive.

Based on the total weight of the components (1) to (5) of the process aid additive, the preferred concentration of the aid additive is about 0.3 to about 100, preferably about 0.9 to about 50 parts by weight per million parts by weight of the olefin introduced into the reactor.

The process aid additive can be added continuously or intermittently to the reactor. In the continuous gas phase polymerisation process according to the present invention, it is preferred to continuously add the additive to the reactor. Sufficient process aid additive is added to maintain its concentration at the desired level.

According to a preferred embodiment of the present invention, before the catalyst is introduced into the reactor, the reactor is pre-loaded with the said process aid additive. This pre-load can be done before or after the introduction of the seed bed polymer into the reactor; however, it is preferred to perform the pre-load solely on the seed bed polymer.

For the pre-load, based on the total weight of the components (1) to (5) of the process aid additive, the preferred concentration of the aid additive is about 0.1 to about 70, preferably about 0.5 to about 50 parts by weight per million part by weight of the seed polymer bed.

According to a preferred embodiment of the present invention, the process aid additive comprises a mixture of either Mazol GMO, Atmer 110 or Atmer 129 with hydrogen peroxide and sodium chloride. Preferably the mixture comprises each component being added to the bed at a concentration of 5 to 20 ppm based on the weight of the olefin introduced in to the reactor.

In accordance with the present invention, there is also provided a process for preventing fouling during the gasphase (co-)polymerisation of olefins in a fluidised bed reactor in the presence of a process aid additive characterised in that the additive comprises at least one of the components selected from (1) a glycerol ester of a fatty acid
(2) a sorbitan ester of a fatty acid
(3) an alkylamine carboxylate along with at least one component selected from (4) hydrogen peroxide and/or water
(5) a salt.

In accordance with the present invention, there is further provided a process for improving the flowability of the polymer and/or the fluidisation characteristics of the polymer during the gas-phase (co-)polymerisation of olefins in a fluidised bed reactor in the presence of a process aid additive characterised in that the additive comprises at least one of the components selected from (1) a glycerol ester of a fatty acid
(2) a sorbitan ester of a fatty acid
(3) an alkylamine carboxylate along with at least one component selected from (4) hydrogen peroxide and/or water
(5) a salt.

Indeed, while not wishing to be bound to the following explanation, the Applicants believe that flowability of the polymer and/or fluidisation characteristics of the polymer are highly critical for running the gas phase polymerisation of olefins. Consequently, and as reflected in the attached examples, the present invention also relates to an ethylene (co)polymer obtainable by the process of the present invention, i.e. a gas-phase (co-)polymerisation process of ethylene in a fluidised bed reactor in the presence of a process aid additive characterised in that the additive comprises at least one of the components selected from:
(1) a glycerol ester of a fatty acid
(2) a sorbitan ester of a fatty acid
(3) an alkylamine carboxylate
along with at least one component selected from
(4) hydrogen peroxide and/or water
(5) a salt.

The process according to the present invention is suitable for the manufacture of polymers in a continuous gas fluidised bed process.

In an advantageous embodiment of this invention, the polymer is a polyolefin preferably comprising copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more $C_4$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the $C_4$–$C_8$ monomer are dec-1-ene and ethylidene norbomene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$–$C_8$ alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335, 526. The process of the invention is particularly well suited to industrial-scale reactors of very large size.

In one embodiment the reactor used in the present invention is capable of producing greater than 300 Kg/hr to about 80,000 Kg/hr or higher of polymer, preferably greater than 10,000 Kg/hr.

As disclosed previously the process aid additive of the present invention may be used with a variety of catalysts in the (co-)polymerisation process. However, the preferred (co-)polymerisation reaction is carried out in the presence of a Ziegler-Natta type catalyst. Most preferably the Ziegler-Natta type catalysts include those derived from titanium halides such as titanium chloride such as described in EP 0595574 which is herein incorporated by reference. These catalysts may be formed by contacting a granular support based on a refractory oxide with:
(a) an organosilicon compound
(b) a dialkylmagnesium and, optionally, a trialkylaluminium compound,
(c) a monochloro-organic compound, and
(d) with at least one tetravalent titanium compound.

In another embodiment of the invention two or more catalyst components can be combined in the catalyst system of the invention. For example, a Ziegler-Natta catalyst or catalyst system such as described above may be combined with a further catalyst, such as a further Ziegler-Natta type catalyst or a metallocene catalyst.

In one embodiment of the process of the invention, olefin(s), preferably ethylene or propylene or combinations thereof are prepolymerised in the presence of the catalyst or catalyst system of the invention prior to the main polymerisation. The prepolymerisation can be carried out batchwise or continuously in gas, solution or slurry phase including at elevated pressures. The prepolymerisation can take place with any alpha-olefin monomer or combination and/or in the presence of any molecular weight controlling agent such as hydrogen. For details on prepolymerisation see U.S. Pat. Nos. 4,923,833, 5,283,278 and 4,921,825 and EP-B-0279 863 all of which are herein fully incorporated by reference.

In another embodiment of the invention, the supported catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the supported catalyst system of the invention includes a polyolefin wax or tackifier or the like.

BRIEF DESCRIPTION OF THE DRAWINGS

FIG. 1 shows the P1 and P2 signals of the electrostatic probe as a function of time for monitoring the effect from the injection of the process aid additive.

The following non-limiting examples illustrate the present invention.

EXAMPLES 1 TO 7

A series of process aid additives were tested on a polyethylene pilot plant. The reactor dimensions are 15 cm in the cylinder and 25 cm in the bulb (diameters). The following conditions were used in all the runs detailed below: a gas reaction mixture, containing ethylene, 1-hexene, hydrogen and nitrogen was passed through the fluidized bed, of 60 cm bed height, with an upward fluidization velocity of 0.23 m/s. The effect of the injection of the process aid additive was monitored using two electrostatic probes, P1 and P2, located within the reactor at grid level (13.5 cm) and bed (50 cm) elevation.

In the following examples, Atmer-129, Atmer 110 and Mazol GMO have the distinct advantage in that they are Food Contact Approved (FCA) as well as carry the designation GRAS (Generally Regarded As Safe). Atmer 129 is a solid at room temperature and is insoluble in pentane. Therefore it is injected as a solid using a discontinuous, solid injection system, using nitrogen to flush the solid in to the reactor.

Instantaneous reductions in the signals from both P1 (from 8000 pA to 6000 pA) and P2 (from 3000 pA to 2000 pA) were observed. The reduction was short-lived, the signals then returning to above their previous levels within a number of minutes. No loss of activity was observed.

EXAMPLE 2

Injection of Atmer 129 and $H_2O_2$

A single dose of 10 ppm Atmer 129 with 10 ppm $H_2O_2$ was injected.

The operating conditions were

| Run conditions | H Bed (cm) | DP (bar) | T (° C.) | $RH_2$ % | $RC_2$ % |
|---|---|---|---|---|---|
| Result | 60 | 14.1 | 84.2 | 7.3 | 25 |

Powder analysis results were:

| Powder Analysis | Density | Grade | MVA | Al | Ti | Si | APS (μm) |
|---|---|---|---|---|---|---|---|
| Results | 0.936 | 1.29 | 0.4 | 95 | 9 | 100 | 620 |

As shown in FIG. 1, within a few minutes there was a sharp decrease in the P1 signal from 11000 to 4000 pA, and in the P2 signal of from 6000 to 1000 pA. The effect advantageously lasted for about 3 hours on both signals. No loss of activity was observed.

EXAMPLE 3

Injection of Atmer 129, $H_2O_2$ and NaCl

A single dose of 10 ppm Atmer 129 with 10 ppm $H_2O_2$ and 10 ppm NaCl was injected. The operating conditions were:

| Run conditions | H lit (cm) | DP (bar) | T (° C.) | $RH_2$ % | $RC_2$ % |
|---|---|---|---|---|---|
| Results | 60 | 14.75 | 84.5 | 7.19 | 24.9 |

The powder analysis was:

| Powder Analysis | Density | Grade | MVA |
|---|---|---|---|
| Results | 0.936 g/cm3 | NA | 0.39 g/cm3 |

There was an instantaneous decrease in the P1 signal from 7000 to 100 pA, and in the P2 signal of from 10000 to 100 pA. The effect advantageously lasted for about 3 hours on both signals. Agitation of the static signal was also significantly reduced. No loss of catalyst activity was observed.

COMPARATIVE EXAMPLE 4

Injection of Atmer 110

A single dose of 20 ppm of Atmer 110 (Ciba) was injected into the reaction. It was pre-diluted in a 20 cc volume pentane solvent.

The operating conditions were:

| Run Conditions | H bed (cm) | DP (bar) | T (° C.) | $RH_2$ % | $RC_2$ % |
|---|---|---|---|---|---|
| Results | 59.5 | 15.3 | 84 | 5.55 | 27.6 |

Powder analysis results:

| Powder Analysis | Density | Grade | MVA | Al | Ti | Si | APS (μm) |
|---|---|---|---|---|---|---|---|
| Results | 0.9248 | 0.8 | 0.139 | 100 | 16.5 | 225 | 513 |

Instantaneous reduction in the signal from P1 (from 5000 pA to 4000 pA) was observed. However the signal from P2 was observed to increase (from 1000 pA to 4000 pA). Both effects lasted for about 2 hours. No loss of activity was observed.

EXAMPLE 5

Injection of Atmer 110 and H2O2

A single dose of 20 ppm Atmer 110 with 10 ppm $H_2O_2$ was injected. It was pre-diluted in a 20 cc volume pentane solvent.

The operating conditions were:

| Run Conditions | H bed (cm) | DP (bar) | T (° C.) | $RH_2$ % | $RC_2$ % |
|---|---|---|---|---|---|
| Results | 59.5 | 15.3 | 84 | 5.55 | 27.6 |

Powder analysis results:

| Powder Analysis | Density | Grade | MVA | Al | Ti | Si |
|---|---|---|---|---|---|---|
| Results | 0.9369 | 1.17 | 0.4 | 68 | 8.1 | 104 |

Within a few minutes there was a decrease in the P1 signal from 3500 to 2500 pA, with a corresponding decrease of from 4000 to 2500 pA on P2. The effect lasted for about 45 minutes of both signals. No loss of catalyst activity was observed.

EXAMPLE 6

Injection of Mazol GMO and $H_2O_2$

A single dose of 20 ppm Mazol GMO (Ciba) with 10 ppm $H_2O_2$ was injected. It was pre-diluted in a 20 cc volume pentane solvent.

The operating conditions were:

| Run Conditions | H lit (cm) | DP (bar) | T (° C.) | $RH_2$ % | $RC_2$ % |
|---|---|---|---|---|---|
| Results | 59.1 | 15 | 83.8 | 9.23 | 27.8 |

Powder analysis results were:

| Powder Analysis | Density | Grade | MVA | Al | Ti | Si | APS ($\mu$m) |
|---|---|---|---|---|---|---|---|
| Results | 0.9379 | 1.2 | 0.39 | 63 | 7.6 | 112 | 614 |

There was an instantaneous decrease in the P1 signal from 4000 to 3000 pA, with a corresponding decrease of from 5000 to 3000 pA on P2. The effect lasted for over 3 hours on both signals. No loss of catalyst activity was observed.

EXAMPLE 7

Injection of Mazol GMO, $H_2O_2$ and NaCl

A single dose of 20 ppm Mazol GMO with 10 ppm $H_2O_2$ and 10 ppm NaCl was injected.

It was pre-diluted in a 20 cc volume pentane solvent.

The operating conditions were:

| Run conditions | H bed (cm) | DP (bar) | T (° C.) | $RH_2$ % | $RC_2$ % |
|---|---|---|---|---|---|
| Results | 60 | 14.9 | 84.2 | 6.7 | 24.9 |

Powder analysis results were:

| Powder Analysis | Density | Grade | MVA | Al | Ti | Si | APS ($\mu$m) |
|---|---|---|---|---|---|---|---|
| Results | 0.9356 | 0.95 | 0.42 | 115 | 10.4 | 116 | 569 |

There was a decrease in the P1 signal from 4000 to 500 pA, with an instantaneous decrease in the P2 signal of from 5000 to 3000 pA. The effect of the process aid was observed for over 3 hours. Agitation of both of the static signals was also significantly reduced for over 3 hours. No loss of catalyst activity was observed.

What is claimed is:

1. A process for the gas-phase (co-)polymerization of olefins comprising (co-)polymerizing olefins in a fluidized bed, gas-phase reactor in the presence of a process aid additive wherein the additive is at least one component selected from the group consisting of (1) a glycerol ester of a fatty acid, (2) a sorbitan ester of a fatty acid, and (3) an alkylamine carboxylate along with at least one component selected from the group consisting of (4) hydrogen peroxide and/or water, and (5) an alkali metal halide.

2. The process according to claim 1 wherein the process aid additive is a mixture of at least one component selected from (1), (2) and (3) with both (4) hydrogen peroxide and/or water and (5) an alkali metal halide.

3. The process according to claim 1 wherein the glycerol ester is selected from one or more of glycerol monooleate, glycerol monostearate, glycerol monolaurate or glycerol monoricinoleate and their derivatives.

4. The process according to claim 1 wherein the sorbitan ester is selected from one or more of sorbitan monoleate, sorbitan, trioleate, sorbitan monostearate, sorbitan monolaurate, sorbitan monoricinoleate, or sorbitan polyoxethylene ester and their derivatives.

5. The process according to claim 1 wherein the alkylamine carboxylate is one or more alkylamine ethoxylates.

6. The process according to claim 1 wherein the alkali metal halide is an alkali metal chloride.

7. The process according to claim 3, wherein the glycerol ester is glycerol monoleate and/or glycerol monostearate.

8. The process according to claim 4, wherein the sorbitan ester is sorbitan trioleate and/or sorbitan polyoxyethylene ester.

9. The process according to claim 6, wherein the alkali metal chloride is sodium chloride.

* * * * *